(12) United States Patent  
Xie

(10) Patent No.: US 9,208,112 B1  
(45) Date of Patent: Dec. 8, 2015

(54) PERMANENT ALLOCATION OF A LARGE HOST MEMORY

(75) Inventor: Jinwen Xie, Sugar Hill, GA (US)

(73) Assignee: American Megatrends, Inc., Norcross, GA (US)

( * ) Notice: Subject to any disclaimer, the term of this patent is extended or adjusted under 35 U.S.C. 154(b) by 858 days.

(21) Appl. No.: 12/765,072

(22) Filed: Apr. 22, 2010

(51) Int. Cl.
*G06F 13/24* (2006.01)
*G06F 12/00* (2006.01)
*G06F 9/00* (2006.01)

(52) U.S. Cl.
CPC ..................... *G06F 13/24* (2013.01)

(58) Field of Classification Search
CPC .................................. G06F 3/00; G06F 13/00
USPC ............ 710/9, 10, 300, 301, 302, 269; 713/2, 713/100
See application file for complete search history.

(56) References Cited

U.S. PATENT DOCUMENTS

| | | | | |
|---|---|---|---|---|
| 4,984,149 | A * | 1/1991 | Iwashita et al. | 711/4 |
| 5,734,911 | A * | 3/1998 | Lai | 710/269 |
| 5,887,164 | A * | 3/1999 | Gupta | 713/2 |
| 6,425,079 | B1 * | 7/2002 | Mahmoud | 713/2 |
| 6,721,868 | B1 * | 4/2004 | Natu et al. | 711/202 |
| 6,760,785 | B1 * | 7/2004 | Powderly et al. | 710/2 |
| 7,334,120 | B2 * | 2/2008 | Rothman et al. | 713/2 |
| 7,958,343 | B2 * | 6/2011 | Thompson | 713/1 |
| 7,987,348 | B2 * | 7/2011 | Swanson et al. | 713/1 |
| 8,291,208 | B2 * | 10/2012 | Thompson | 713/1 |
| 2001/0018721 | A1 * | 8/2001 | McKenna et al. | 710/126 |
| 2004/0123019 | A1 * | 6/2004 | Garney | 711/102 |
| 2005/0027978 | A1 * | 2/2005 | Neuman et al. | 713/2 |
| 2009/0216987 | A1 * | 8/2009 | Krishnan | 711/171 |

OTHER PUBLICATIONS

Option ROM, Wikiedia, <http://en.wikipedia.org/wiki/Option_ROM>, accessed on Jan. 4, 2011.*
BIOS Boot Specification, version 1.01, Jan. 11, 1996.*
How Interrupts Work, <http://www.cci-compeng.com/Unit_5_PC_Architecture/5610_How_Interrupts_Work.htm., accessed on Mar. 28, 2013.*
BIOS Interrupt Call, <http://en.wikipedia.org/wiki/BIOS_interrupt_call>, accessed Dec. 17, 2014.*

* cited by examiner

*Primary Examiner* — Khanh Dang
(74) *Attorney, Agent, or Firm* — Lee & Hayes, PLLC

(57) ABSTRACT

An add-in card allocates memory from a host computer. An option ROM on the add-in card includes a first interrupt handler for handling an interrupt for resetting a mass storage device that reads a system address map, modifies the system address map by adding an entry for an amount of host memory to be allocated to the add-in card, and stores the modified system address map as a destination system address map. The first interrupt handler also changes the address of an interrupt handler for providing the system address map to the address of a second interrupt handler also stored in the option ROM of the add-in card. When an interrupt is generated that requests the system address map, the second interrupt handler reads the destination system address map, which includes a memory allocation for the add-in card, and provides the destination system address map to the requestor.

19 Claims, 9 Drawing Sheets

| START ADDRESS | LENGTH | ATTRIBUTE |
|---|---|---|
| 00000000 | 639K | AVAILABLE |
| 0009FC00 | 1K | RESERVED |
| 000F0000 | 64K | RESERVED |
| 00100000 | 7M | RESERVED |
| 00800000 | 8M | RESERVED |
| 01000000 | 1200M | AVAILABLE |
| FEC00000 | 4K | RESERVED |

INT 15 E820 TABLE
(SYSTEM ADDRESS MAP)

Fig. 4A

PERMANENT ALLOCATION OF A LARGE HOST MEMORY

BACKGROUND

Desktop and laptop personal computer systems typically utilize a Basic Input/Output System ("BIOS"). The BIOS performs functions for initializing the hardware of the computer system, performing a Power On Self-Test ("POST"), providing a defined interface for accessing hardware features to an operating system, and others. The legacy system BIOS specification did not define any mechanism for permitting computer system add-in cards, such as Peripheral Component Interconnect ("PCI") cards, to permanently allocate memory from the host computer for use during POST and operating system execution. The PCI Firmware Specification, Version 3.0, introduced a feature by which an add-in card can permanently allocate memory from a host computer. However, the maximum memory that can be allocated using this feature is only 40 kilobytes ("K"), which is insufficient for the operation of many add-in cards.

In order to address the problem described above, some add-in card manufacturers simply added more random access memory ("RAM") to their add-in cards. However, the addition of RAM may add a significant expense to the cost of an add-in card. Another solution to the problem described above is to customize the operation of the system BIOS to allow PCI devices to permanently allocate large amounts of memory. This solution, however, is only viable for PCI devices that exist on the same motherboard as the custom system BIOS and the system RAM. As a result, there is currently no mechanism available for computer system add-in cards to permanently allocate host memory in amounts greater than 40K.

It is with respect to these and other considerations that the disclosure presented herein has been made.

SUMMARY

Technologies are provided herein for permanent allocation of large amounts of host memory (e.g. greater than 40K). In particular, through an implementation of the concepts and technologies presented herein, a computer system add-in card can permanently allocate large amounts memory from the host computer in which it resides. This eliminates the need to add RAM to an add-in card. The functionality described herein can also be accomplished without modification of the system BIOS, thereby enabling the use of this functionality with an unmodified host computer. It should be appreciated that the term "permanent" as utilized herein refers to an allocation of memory for use during both the POST and the runtime of a computing system. It is not intended to mean that the memory allocation survives a reboot of the host computer.

According to one aspect presented herein, an add-in card is provided that is configured to allocate memory from a host computer in which the add-in card is installed. An option read-only memory ("ROM") on the add-in card includes an interrupt handler for handling an interrupt for resetting a mass storage device. The interrupt handler may be an interrupt handler for handling an interrupt 13h, AH=00h, in an x86-based computing system.

In response to intercepting an interrupt for resetting the mass storage device, the interrupt handler reads a system address map and modifies the system address map by adding an entry for an amount of host memory to be allocated to the add-in card. The interrupt handler then stores the modified system address map as a destination system address map. The modified system address map may be stored in an Extended BIOS Data Area ("EBDA"), which may be located in a RAM of the host computer.

The interrupt handler for handling a request to reset the mass storage device also changes the address of an interrupt handler for providing the system address map. For instance, the address of an interrupt handler for providing the system address map may be modified in an interrupt handler table ("IVT" or "interrupt vector table") of the host computer. The address of the interrupt handler for providing the system address map is changed to an address of an interrupt handler also stored in the option ROM of the add-in card. The interrupt for providing the system address map may be an interrupt 15h, AX=E820, in an x86-based computing system. The address of the original handler for handling this interrupt is also stored in a runtime area utilized by the option ROM.

When an interrupt is generated that requests the system address map, the interrupt handler in the add-in card option ROM handles the interrupt. In particular, the interrupt handler reads the destination system address map, which includes a memory allocation for the add-in card, and provides the destination system address map to the requestor. If the interrupt is directed to another function, the interrupt handler calls the previously stored address of the original handler for the interrupt.

According to another aspect, the interrupt handler for handling the interrupt for resetting the mass storage device first determines whether a flag has been previously set that indicates that the system address map has been previously modified to include the allocation of memory to the add-in card. If the interrupt handler determines that the flag has been set, the interrupt handler resets a mass storage device without modifying the system address map, without storing the destination system address map, and without changing the address of the interrupt handler for providing the system memory map. In this manner, the system address map is modified to include the memory allocated to the add-in card only once.

It should be appreciated that the above-described subject matter may also be implemented as a computing system, a computer-controlled apparatus, a computer process, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 4A and 4B are data structure diagrams showing aspects of a system address map utilized in embodiments presented herein;

DETAILED DESCRIPTION

The following detailed description is directed to technologies for permanent allocation of a large host memory by a computer system add-in card. In the following detailed description, references are made to the accompanying drawings that form a part hereof, and which are shown by way of exemplary embodiments and implementations. Note that although the subject matter presented herein has been described in conjunction with one or more particular embodiments and implementations, it is to be understood that the embodiments are not necessarily limited to the specific structure, configuration, or functionality described herein. Rather, the specific structure, configuration, and functionality described herein are disclosed as examples. Various modifications and changes may be made to the subject matter described herein without following the exemplary embodiments and applications illustrated and described, and without departing from the true spirit and scope of the embodiments disclosed herein.

Figure 1:
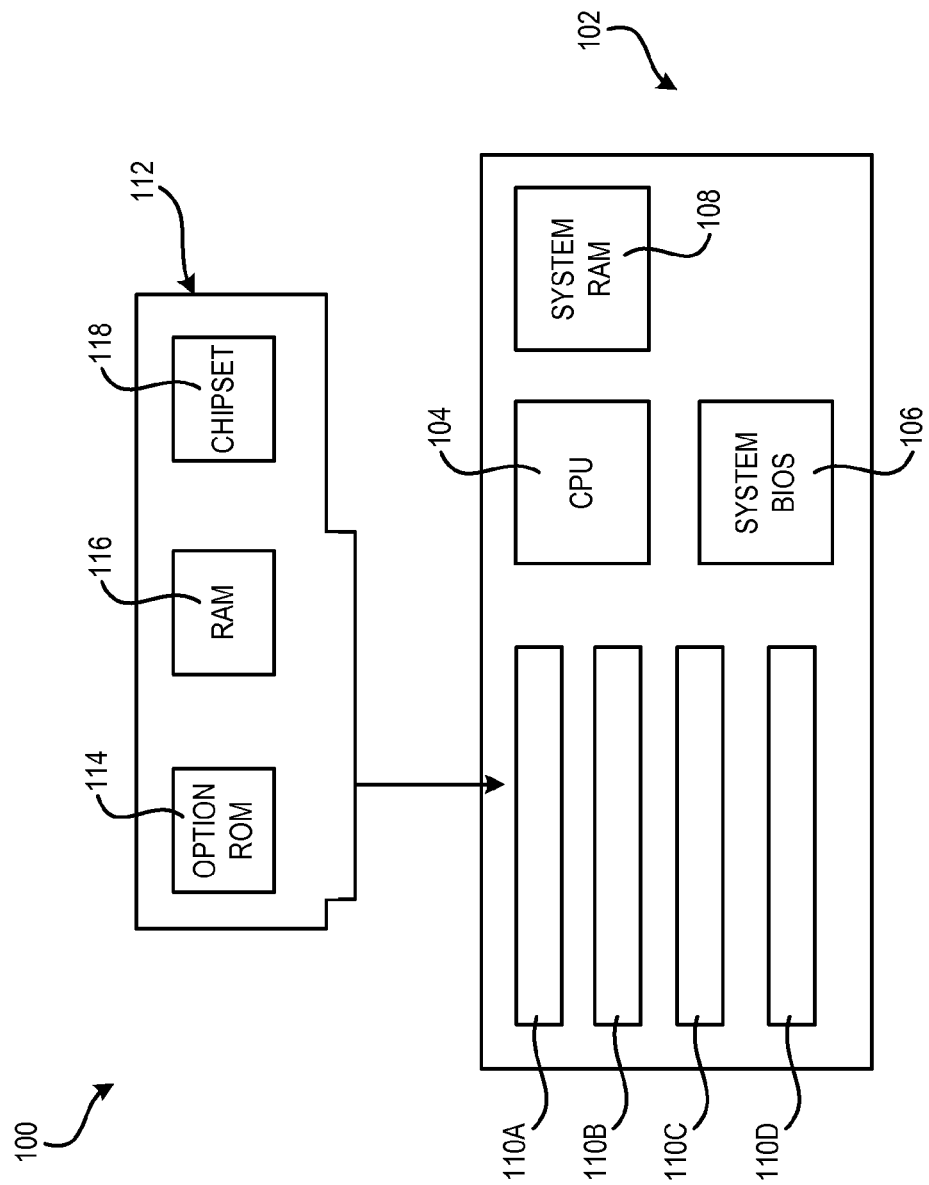
FIG. 1 is a simplified computer system hardware diagram showing aspects of an add-in card that embodies aspects presented herein and a host computer configured to receive the add-in card.

FIG. 1 is a simplified computer system hardware diagram showing aspects of an add-in card 112 that embodies aspects presented herein, and a host computer 102 configured to receive the add-in card 112. In particular, a motherboard for a host computer 102 is illustrated in FIG. 1. As illustrated, the motherboard includes a central processing unit 104 ("CPU"), a system BIOS 106, and system RAM 108. The motherboard also includes a number of card slots 110A-110D for receiving add-in cards, such as the add-in card 112. It should be appreciated that the motherboard illustrated in FIG. 1 has been simplified and that many more components may be utilized than shown in FIG. 1.

As known to those skilled in the art, the CPU 104 is a central processor that performs arithmetic and logic operations necessary for the operation of the computer 102. The CPU 104 may execute program code from the system RAM 108 or directly from another type of computer-readable mass storage device, such as a non-volatile random access memory ("NVRAM") storing the system BIOS 106. As briefly discussed above, the system BIOS 106 is an executable program that performs functions for initializing the hardware of the computer 102, for performing a power-on self test ("POST"), for providing a defined interface for accessing hardware features of the computer 102, and other functions. The system BIOS 106 is executed by the CPU 104 when the computer 102 is powered on. Additional details regarding the POST and the boot process performed by the computer 102 at power on will be described below with reference to FIGS. 2-3.

As discussed briefly above, the motherboard illustrated in FIG. 1 includes a number of slots 110A-110D for accepting add-in cards, such as the add-in card 112. According to one implementation, the slots 110A-110D are compatible with the Peripheral Component Interconnect ("PCI") standard. It should be appreciated that other types of add-in cards compatible with other types of bus standards might also be utilized. The add-in card 112 includes a connector for mating with the slots 110A-110D and establishing appropriate electrical connections thereby.

As also illustrated in FIG. 1, the add-in card might include a chipset 118 that controls the operation of the add-in card 112. The add-in card 112 might also include a RAM 116 for temporary storage of variables. As will be discussed in greater detail below, the RAM 116 is utilized in one embodiment presented herein to store a destination system address map that includes an allocation of RAM from the computer 102 to the add-in card 112. Details regarding the use of the RAM 116 for this purpose will be provided below.

The add-in card 112 might also include an option ROM 114. As known to those skilled in the art, the option ROM 114 of an add-in card 112 contains program code executable by the CPU 104. Portions of the option ROM 114 are executed during the POST performed by the computer 102 and other portions are executed at runtime. In one embodiment, the option ROM 114 of the add-in card 112 includes program code for implementing the functionality described herein for permanently allocating a large portion of the system RAM 108 (i.e. greater than 40K) to the add-in card 112. Additional details regarding this functionality will be provided below. In the embodiments presented herein, the add-in card 112 comprises a mass storage device controller card. It should be appreciated, however, that the embodiments presented herein might be utilized with other types of cards, such as a video display adapter, a network card, or other types of add-in cards.

It should also be appreciated that the illustrative operating environment 100 shown in FIG. 1 is but one operating environment for the various embodiments presented herein. Other operating environments may utilize other types of bus standards for connecting the add-in card 112 to the computer 102, other types of central processing units 104, chipsets 118, and other hardware components. It should be appreciated in this regard that the various hardware components described herein are merely illustrative and that other types of components might also be utilized.

Figure 2:
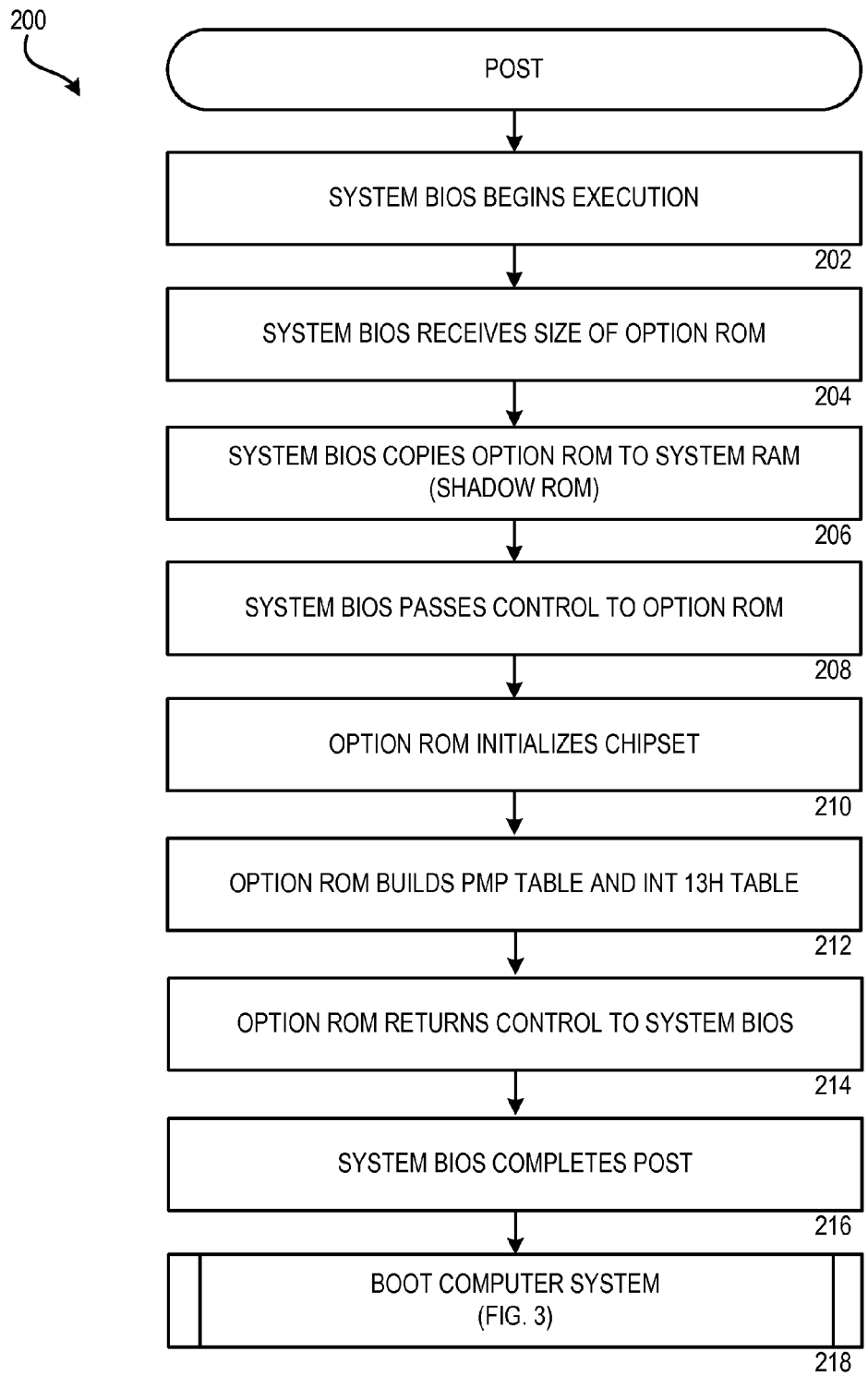
FIGS. 2 and 3 are flow diagrams showing illustrative routines that describe aspects of POST and boot processes performed by a host computer utilized in one embodiment presented herein, respectively.

FIG. 2 is a flow diagram showing an illustrative routine that describes aspects of a POST process performed by a host computer utilized in one embodiment presented herein. In particular, a routine 200 is shown in FIG. 2 that illustrates aspects of a POST performed by the computer 102. It should be appreciated that the logical operations described herein with respect to the various figures are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

The routine 200 illustrated in FIG. 2 begins at operation 202, where the system BIOS 106 begins execution on the CPU 104. The routine 200 then proceeds to operation 204, where the system BIOS 106 receives the size of the option ROM 114 from the add-in card 112. The routine 200 then proceeds to operation 206 where the system BIOS 106 copies the contents of the option ROM 114 to the system RAM 108. This is referred to as "shadowing" the option ROM 114 in the system RAM 108. This process is performed in order to allow the option ROM 114 to execute from system RAM 108 rather than from the ROM 114 on the add-in card. Shadowing the option ROM 114 is optional.

From operation 206, the routine 200 proceeds to operation 208, where the system BIOS 106 passes control to the copy of the option ROM 114 in the system RAM 108. In this manner, the option ROM 114 is executed by the CPU 104. From operation 208, the routine 200 proceeds to operation 210 where the option ROM 114 executing from the RAM 108 initializes the chipset 118 of the add-in card 112. From operation 210, the routine 200 proceeds to operation 212 where the option ROM 114 executing from the RAM 108 builds a Plug and Play ("PNP") table that reports to the system BIOS the number of active devices that the add-in card has and the interrupt 13h table. As known in the art, the interrupt 13h table ("INT 13h") in an x86-based computing system is a table that identifies the mass storage devices available to the computing system. In this example, the add-in card 112 is a mass storage controller card and, therefore, builds a portion of the INT 13h table in order to notify the computer 102 of the connected mass storage devices.

Once the option ROM 114 has completed its execution from the system RAM 108, the option ROM 114 returns control to the system BIOS 106. This occurs at operation 214. The routine 200 then proceeds to operation 216 where the system BIOS 106 completes the POST. For instance, the system BIOS 106 may test the system RAM 108, may test other components of the computer 102, and may perform other functions in preparation for a boot of the computer 102. The computer is then booted at operation 218. An illustrative routine showing several aspects of the boot process will be described below with reference to FIG. 3.

Figure 3:
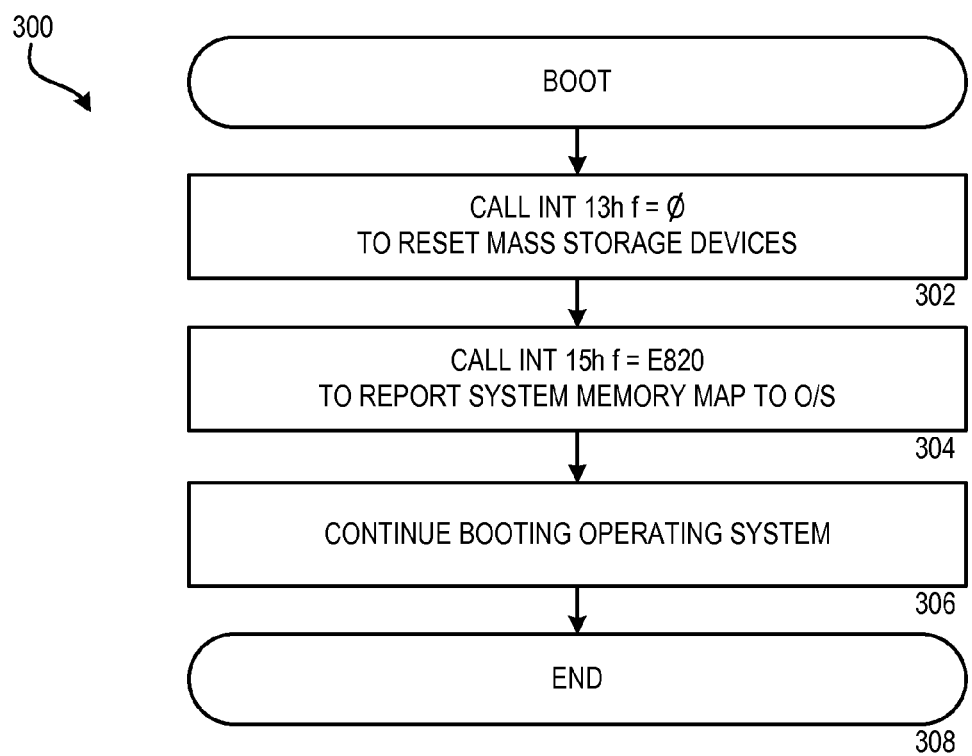

Referring now to FIG. 3, an illustrative routine 300 will be described that show aspects of a boot process performed by the computer 102. It should be appreciated that the routine shown in FIG. 3 is simplified in order to show aspects of the boot process performed by the computer 102 related to the operation of the add-in card 112 and necessary to understand the various concepts presented herein. It should be appreciated that the computer 102 performs many additional operations other than those shown in FIG. 3 during a normal initial program load ("IPL").

The routine 300 begins at operation 302 where the system BIOS 106 calls interrupt 13h, AH=00, on an x86-based computing system in order to reset the connected mass storage devices. As known to those skilled in the art, the interrupt 13h interface on an x86-based computing system supports many different commands that can be provided to the system BIOS 106, which then passes them on to the appropriate mass storage device. These commands include reading, writing, formatting, and resetting the mass storage devices. As mentioned above interrupt 13h, AH=00, corresponds to a command for resetting the mass storage devices. As will be described in greater below, the option ROM 114 on the add-in card 112 performs processing during the handling of the interrupt 13h, AH=00, in order to allocate a portion of the system RAM 108 to the add-in card 112. Additional details regarding this process will be provided below with respect to FIGS. 4A-6.

From operation 302, the routine 300 proceeds to operation 304 where the system BIOS 106 calls interrupt 15h, AX=E820, on an x86-based computing system. As known in the art, interrupt 15h, AX=E820, is utilized to report a system memory map to an operating system executing on the computer 102. As will be discussed in greater detail with respect to FIGS. 4A-4B, the system memory map is maintained by the computing system 102 and provides information regarding whether various portions of the system RAM 108 have been reserved or whether these portions are available for reservation and use by other program components.

As will also be discussed in greater detail below with respect to FIGS. 4A-6, the option ROM 114 is configured to trap the interrupt 15h, AX=E820 call and to return a modified system memory map that includes an allocation of the system RAM 108 to the add-in card 112. Additional details regarding this process will be provided below with respect to FIGS. 4A-7. From operation 304, the routine 300 proceeds to operation 306 where the computer 102 continues to boot an operating system. The routine 300 proceeds to operation 308, where it ends.

Figure 4B:
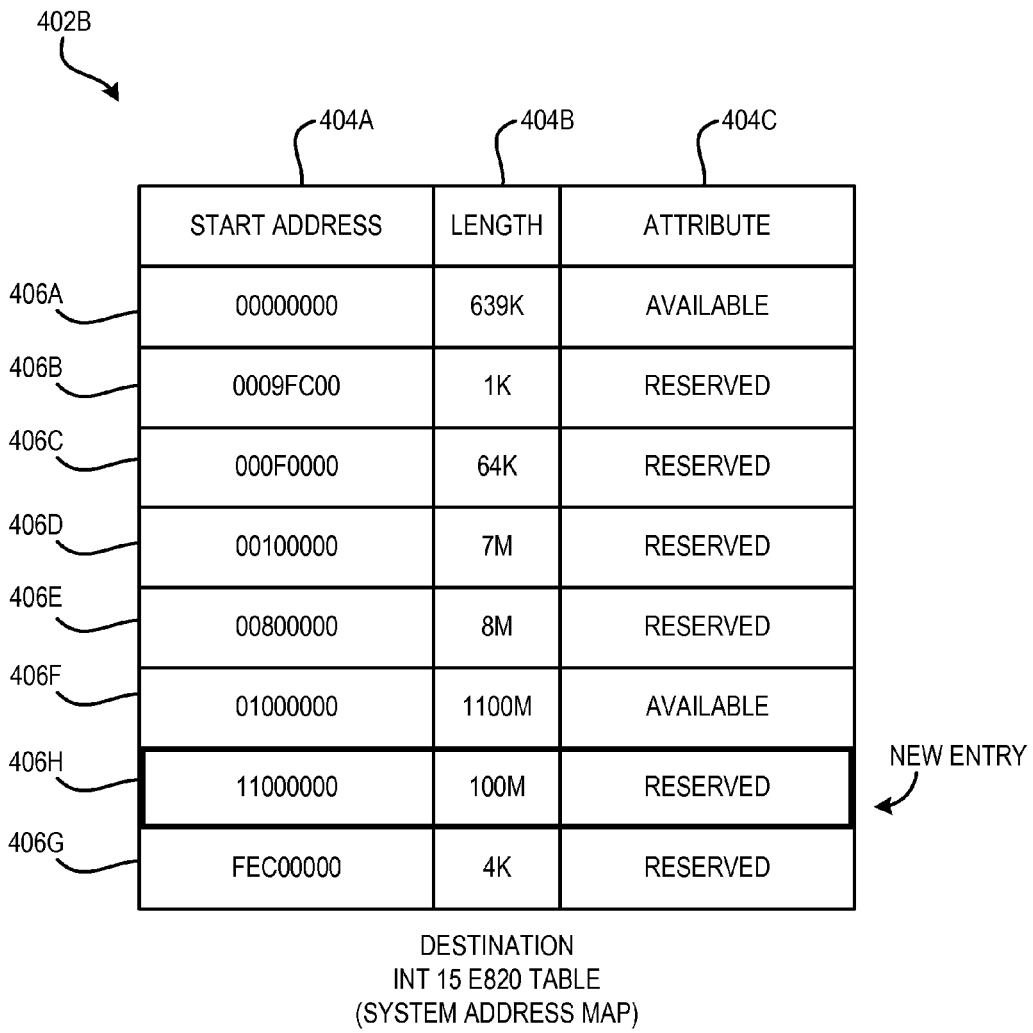

FIGS. 4A and 4B are data structure diagrams showing aspects of a system address map utilized in embodiments presented herein. The system address map may also be referred to herein as a system memory map or simply as an "address map" or a "memory map".

As discussed briefly above, a system address map 402A is maintained by the computer 102. The system address map 402A includes data identifying how the system RAM 108 has been allocated. For instance, in one implementation, the system address map 402A includes a field 404A indicating the starting address of an allocation of the system RAM 108, a field 404B indicating the length of the allocation of the system RAM 108, and a field 404C indicating whether the corresponding memory region is available or reserved. In the example system address map 402A shown in FIG. 4A, a number of entries 406A-406G have been entered into the system address map 402A. The entry 406A indicates, for instance, that 639K of the system RAM 108 is available starting at the address 00000000. Similarly, the entry 406E indicates that 8M of the system RAM 108 has been reserved starting at the address 00800000. It should be appreciated that the system address map actually utilized by the computer 102 in various implementations may include other information than that shown in FIG. 4A or may be organized in a different fashion than illustrated in FIG. 4A.

As described briefly above, the option ROM 114 on the add-in card 112 includes functionality for allocation a large (i.e. greater than 40K) portion of the system RAM 108 to the add-in card 112 permanently. In order to perform such an allocation, the option ROM 114 includes program code capable of adding an entry to the system address map 402A. For instance, the destination system address map 402B shown in FIG. 4B includes an entry 406H added by the option ROM 114. The entry 406H indicates that the add-in card 112 has allocated 100M of the system RAM 108 starting at the address 11000000. As will be described in greater detail below, the destination system address map 402B shown in FIG. 4B may be stored in the RAM 116 of the add-in card 112. The destination system address map 402B shown in FIG. 4B may be provided in response to intercepting an interrupt 15h, AX-E820 on an x86-based computing system. Additional details regarding this process will be provided below with reference to FIGS. 5-7.

Figure 5:
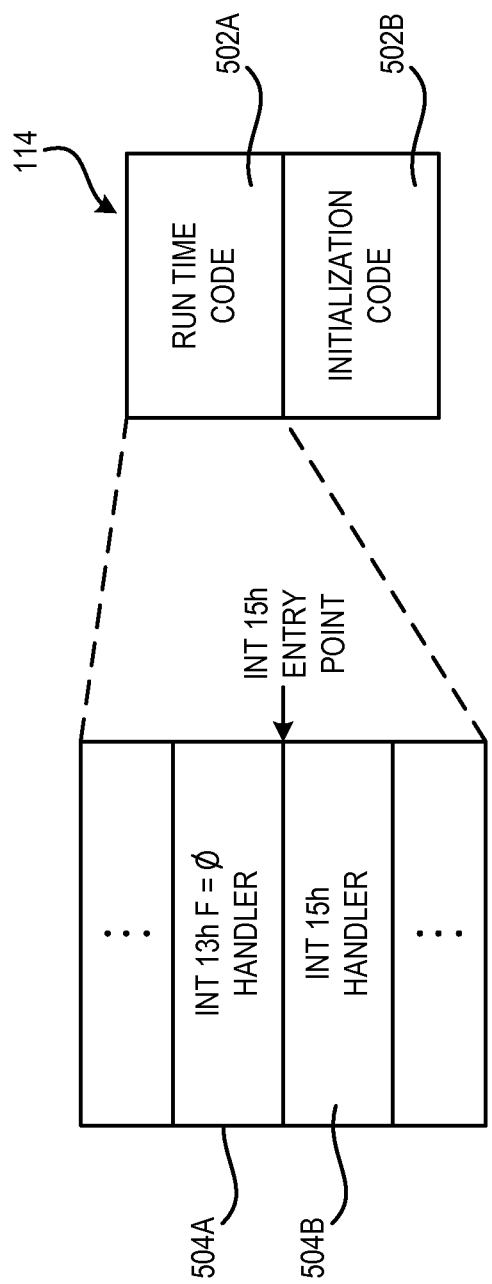
FIG. 5 is a data structure diagram showing aspects of an add-in card option read-only memory ("ROM") provided in one embodiment presented herein.

FIG. 5 is a data structure diagram showing aspects of an add-in card option ROM 114 provided in one embodiment presented herein. As discussed above, the option ROM 114 resides on the add-in card 112 and is executed by the computer 102. As shown in FIG. 5, the option ROM 114 provided in embodiments herein includes runtime code 502A and initialization code 502B. As discussed above, the initialization code 502B of the option ROM 114 is executed during the POST of the computer 102 in order to initialize the chipset 118 and to prepare the add-in card 112 for operation.

The runtime code 502A is utilized during runtime of the computer 102. For instance, portions of the runtime code 502A may be executed in response to calls from an operating system executing on the computer 102. According to one implementation described herein, the runtime code 502A includes an interrupt 13h, AH=00h handler 504A. As discussed above, interrupt 13h, AH=00h is utilized during POST to reset mass storage devices. As will be described in greater detail below, the interrupt 13h, AH=00h handler 504A is configured to modify the system address map 402 in order to allocate a portion of the system RAM 108 to the add-in card 112. Additional details regarding the operation of the option ROM 114 interrupt 13h, AH=00h handler 504A will be described below with reference to FIG. 6.

As also shown in FIG. 5, the runtime code 502A also includes an interrupt 15h handler 504B. As discussed briefly above, the interrupt 15h handler executing on an x86-based computer 102 returns the system address map 402 in response to requests, such as from an operating system executing on the computer 102. As will also be described in greater detail below, the interrupt 15h handler 504B in the option ROM 114 is configured to return the destination address map 402B that has been modified to include an allocation of the system RAM 108 to the add-in card 112.

In order for the interrupt 15h handler 504 to be executed, the interrupt 13h handler 504A changes the address of an interrupt handler for providing a system address map. For instance, the interrupt 13h handler 504 might modify an interrupt vector table of the computer 102 for an interrupt 15h handler to point to the interrupt 15h entry point of the interrupt 15h handler 504B in the option ROM 114. The interrupt 13h handler 504A might also store the address of the original handler for handling interrupt 15h in the RAM 116 of the add-in card 112. In this manner, when an interrupt 15h is intercepted that is not memory related, the interrupt handler originally intended to process interrupt 15h may be called instead of the interrupt 15h handler 504 in the option ROM 114. Additional details regarding this process will be provided below with respect to FIGS. 6 and 7.

Figure 6:
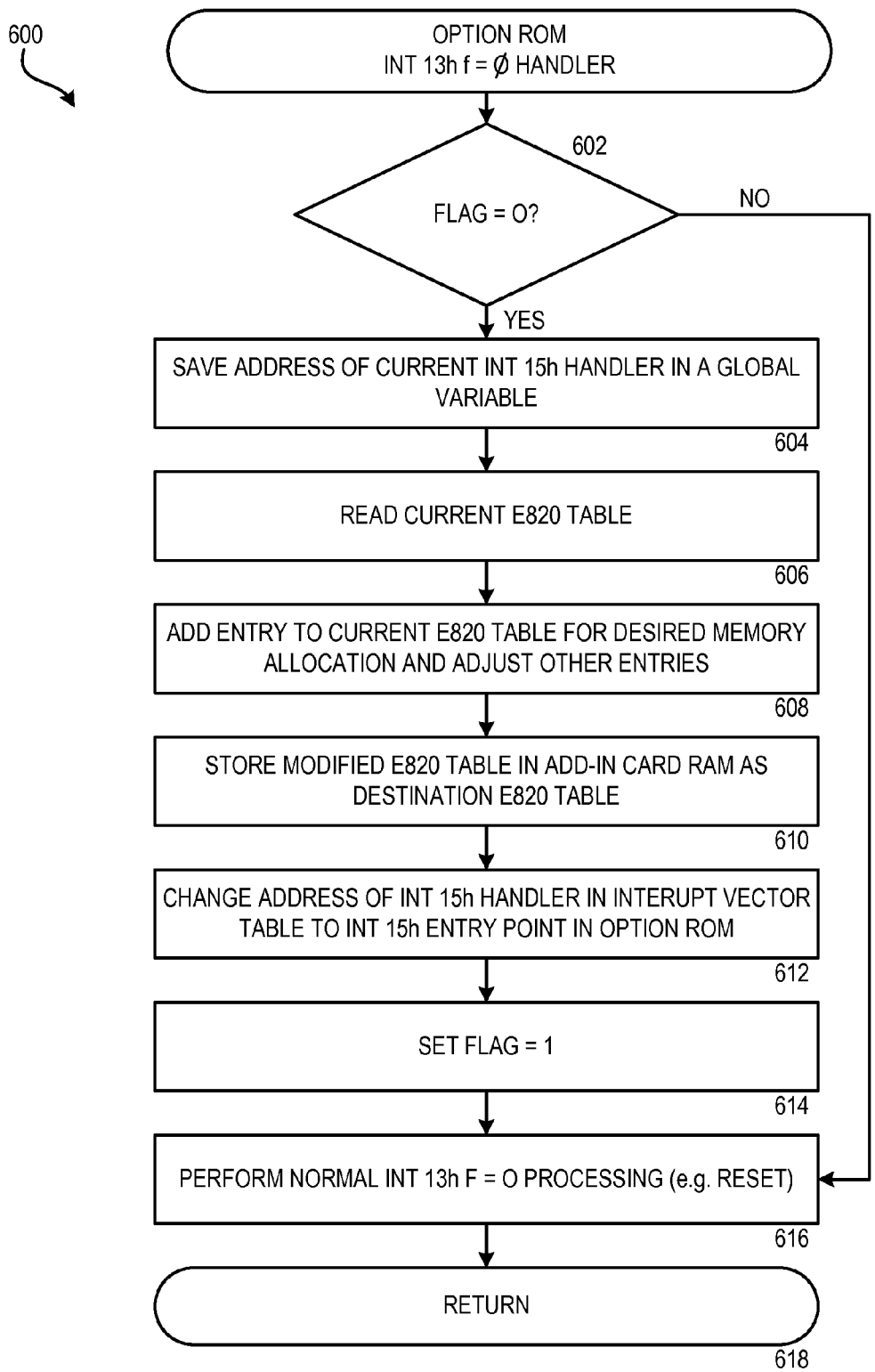
FIG. 6 is a flow diagram showing aspects of an option ROM interrupt 13h handler provided by an add-in card in embodiments presented herein.

FIG. 6 is a flow diagram showing aspects of the option ROM interrupt 13h handler 504A stored on the option ROM 114 of the add-in card 112 in one embodiment. As discussed above, the interrupt 13h, AH=00h handler 504A is executed during POST of the computer 102. The routine 600 begins at operation 602, where the interrupt 13h handler 504A determines whether a flag has previously been set. As will be discussed in greater detail below, a flag is set by the interrupt 13h handler 504A at operation 614. When the option ROM interrupt 13h handler 504A begins execution, it determines whether the flag has been previously set. If, at operation 602, the interrupt 13h handler 504A determines that the flag has been previously set, the routine 600 proceeds to operation 616 where normal interrupt 13h processing is performed. For instance, the interrupt 13h handler 504A might reset connected mass storage devices in a traditional fashion. If, however, the interrupt 13h handler 504A determines at operation 602 that the flag has not been previously set, then the routine 600 proceeds from operation 602 to operation 604.

At operation 604, the interrupt 13h handler 504A saves the memory address of the current interrupt 15h handler in a global variable stored in the RAM 116. For instance, the system BIOS 106 might include program code for handling interrupt 13h. The address of this code is saved in the RAM 116 of the add-in card 112. As discussed briefly above and more fully below, the address of the current interrupt 15h handler may be utilized to process non-memory related interrupt 15h calls. Additional details regarding this process will be provided below.

From operation 604, the routine 600 proceeds to operation 606 where the interrupt 13h handler 504A reads the system address map 502A from the system RAM 108. The routine 600 then proceeds to operation 608 where the interrupt 13h handler 504A adds an entry to the system address map 402A for the desired memory allocation to the add-in card 112. As described above, this allocation may be made in amounts greater than 40K. The interrupt 13h handler 504A also adjusts other entries in the system address map 402A and adjusts an entry in the system address map 502A indicating the amount of free memory available.

Once the entry for the allocation of system RAM 108 to the add-in card 112 has been made in the system address map 402A, the routine 600 proceeds to operation 610. At operation 610, the interrupt 13h handler 504A stores the modified system address map 502A in the RAM 116 of the add-in card 112. The modified system address map 502B may be referred to herein as the destination system address map, or the destination "E820 table".

From operation 610, the routine 600 proceeds to operation 612 where the interrupt 13h handler 504A changes the address of the interrupt 15h handler in the interrupt descriptor table of the computer 102 to point to the entry point in the option ROM 114 of the interrupt 15h handler 504B. In this manner, interrupt 15h is trapped and the interrupt 15h handler 504B in the option ROM 114 will be executed in response to the occurrence of an interrupt 15h.

Once the address of the interrupt 15h handler in the interrupt descriptor table has been modified, the routine 600 proceeds to operation 614. At operation 614, the flag described above is set equal to one, thereby indicating that the system address map has been modified and should not be modified again. From operation 614, the routine 600 proceeds to operation 616 where the interrupt 13h handler 504A performs normal interrupt 13h, AH=00h processing. For instance, as discussed above, this might include resetting any mass storage devices connected to the add-in card 112. From operation 616, the routine 600 proceeds to operation 618, where it ends.

Figure 7:
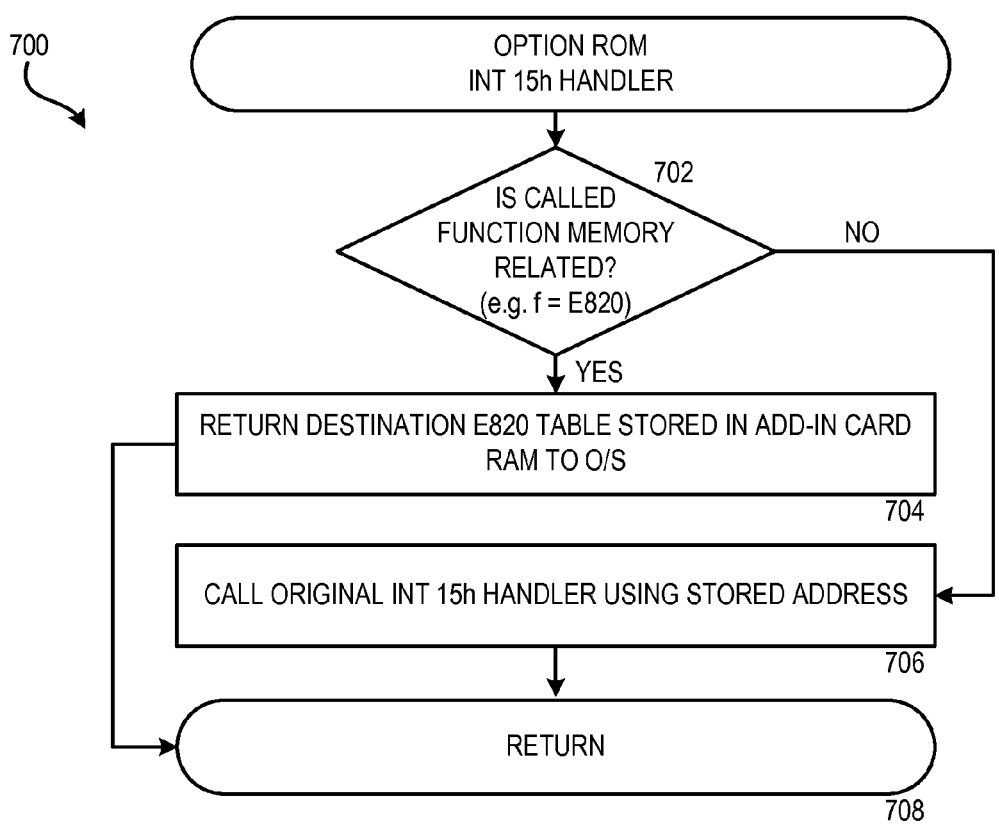
FIG. 7 is a flow diagram showing aspects of an option ROM interrupt 15h handler provided by an add-in card in embodiments presented herein.

FIG. 7 is a flow diagram showing a routine 700 that illustrates aspects of the operation of the interrupt 15h handler 504B in the option ROM 114. As discussed briefly above, an entry in an interrupt descriptor table maintained by the computer 102 for an interrupt 15h handler is modified by the interrupt 13h handler 504A to point to the interrupt 15h entry point for the interrupt 15h handler 504B in the option ROM 114. In this manner, the interrupt 15h handler 504B in the option ROM 114 intercepts interrupt 15h interrupts when generated within the computer 102. The routine 700 illustrated in FIG. 7 illustrates the operation of the interrupt 15h handler 504B when an interrupt 15h is intercepted.

The routine 700 begins at operation 702 where the interrupt 15h handler 504B determines whether the function called by the interrupt is memory related. For instance, the interrupt 15h handler 504B may determine whether the function called by the interrupt is equal to E820 in an x86-based computing system (AX=E820). If the interrupt 15h is not memory related, the routine 700 proceeds from operation 702 to operation 706. At operation 706, the original interrupt 15h handler, such as within the system BIOS 106, is called using the address stored in the RAM 116. As discussed above, the interrupt 13h handler 504A stored the address of the original interrupt 15h handler during its execution. In this manner, the original interrupt 15h handler provided by the computer 102 can be called for interrupt 15h functions that are not memory related (i.e. functions other then E820).

If, at operation 702, the interrupt 15h handler 504B determines that the called function is memory related, the routine 700 proceeds from operation 702 to operation 704. At operation 704, the interrupt 15h handler 504B returns the destination address map 402B stored in the RAM 116 of the add-in card 112 and responds to the interrupt. As described above, the destination system address map stored in the RAM 116 of the add-in card 112 includes an allocation of the system RAM 108 for the add-in card 112. The allocation of the portion of system RAM 108 to the add-in card 112 may be large (i.e. greater than 40K) and permanent in that it survives during the entire boot time of the computer 102. This allows the add-in card 112 to allocate large amounts of the system RAM 108 to itself permanently without modification of the system BIOS 106. This also allows the option ROM 114 access to large amounts of RAM without adding additional RAM 116 to the add-in card 112. From operation 704 and 706, the routine 700 proceeds to operation 708, where the routine 700 returns.

Figure 8:
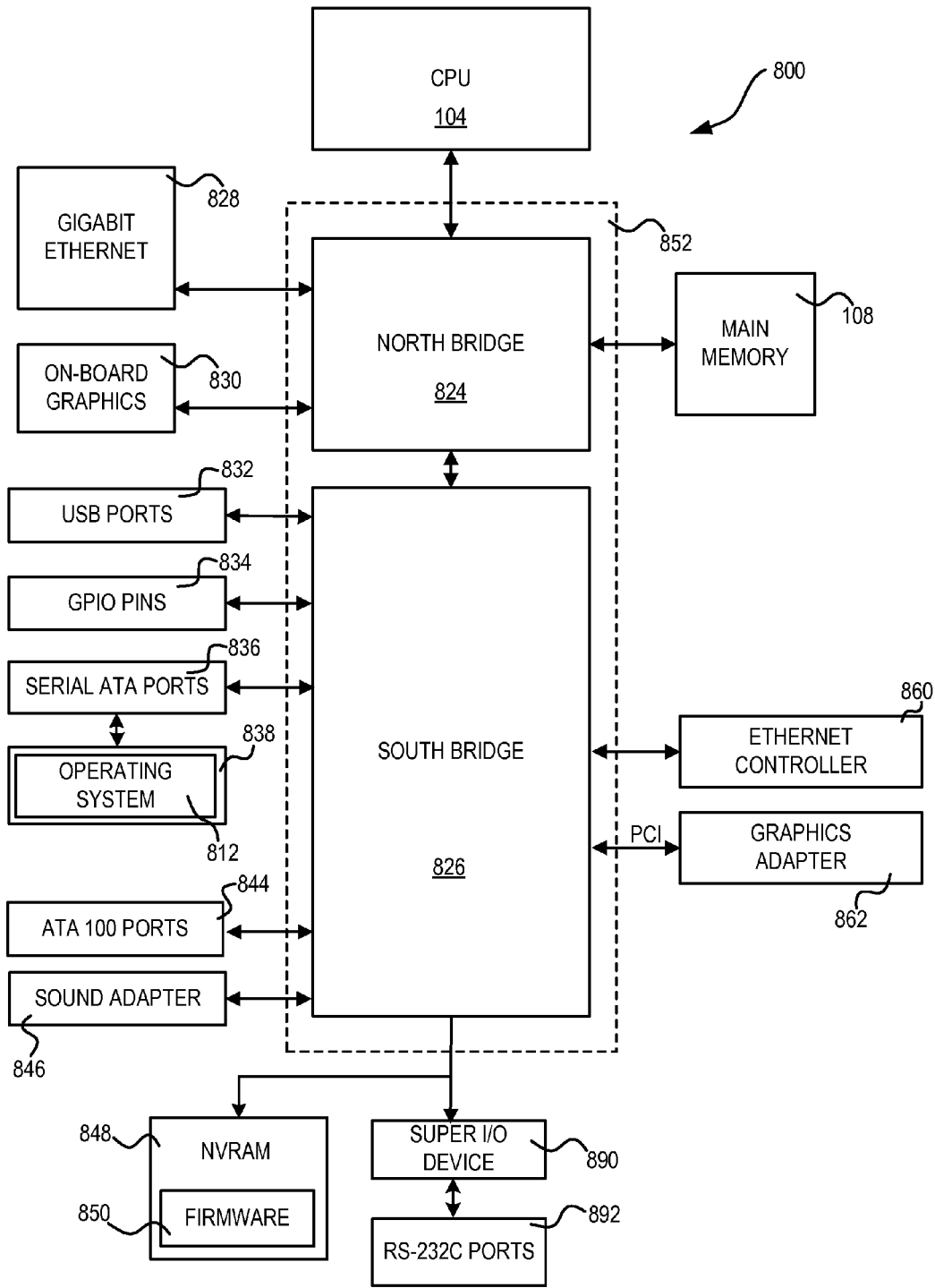
FIG. 8 is a computer architecture diagram showing an illustrative computer architecture that might be utilized to implement a computing system that embodies the various concepts and technologies presented herein.

FIG. 8 is a computer architecture diagram showing an illustrative computer architecture that might be utilized to implement a computing system that embodies the various concepts and technologies presented herein. FIG. 8 and the following discussion are intended to provide a brief, general description of one suitable computing environment in which the embodiments described herein may be implemented. While the technical details are presented herein in the general context of program modules that execute in conjunction with the execution of a firmware, those skilled in the art will recognize that the embodiments may also be implemented in combination with other program modules.

Generally, program modules include routines, programs, components, data structures, scripts, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices.

As discussed briefly above, FIG. 8 shows an illustrative computer architecture that may be utilized to embody a computing system capable of accepting an add-in card configured to permanently allocate host memory in the manner presented above. The illustrative computer architecture shown in FIG. 8 is for a computer 800 that includes a baseboard, or "motherboard", which is a printed circuit board to which a multitude of components or devices may be connected by way of a system bus or other electrical communication path. In one illustrative embodiment, a CPU 104 operates in conjunction with a chipset 852. As discussed briefly above, the CPU 104 is a central processor that performs arithmetic and logical operations necessary for the operation of the computer. The computer 800 may include a multitude of CPUs 104. Each CPU 104 might include multiple processing cores.

The chipset 852 includes a north bridge 824 and a south bridge 826. The north bridge 824 provides an interface between the CPU 102 and the remainder of the computer 800. The north bridge 824 also provides an interface to a RAM 108 used as the main memory in the computer 800 and, possibly, to an on-board graphics adapter 830. As discussed above, the add-in card 112 includes functionality for allocating portions of the RAM 108 to itself in the manner presented above.

The north bridge 824 may also include functionality for providing networking functionality through a gigabit Ethernet adapter 828. The gigabit Ethernet adapter 828 is capable of connecting the computer 800 to another computer via a network. Connections that may be made by the network adapter 828 may include LAN or WAN connections. LAN and WAN networking environments are commonplace in offices, enterprise-wide computer networks, intranets, and the Internet. The north bridge 824 is connected to the south bridge 826.

The south bridge 826 is responsible for controlling many of the input/output functions of the computer 800. In particular, the south bridge 826 may provide one or more universal serial bus ("USB") ports 832, a sound adapter 846, an Ethernet controller 860, and one or more general-purpose input/output ("GPIO") pins 834. The south bridge 826 may also provide a bus for interfacing peripheral card devices such as a graphics adapter 862. In one embodiment, the bus comprises a PCI bus having various devices thereupon, such as the add-in card 112.

The south bridge 826 is also configured to provide one or more interfaces for connecting mass storage devices to the computer 800. For instance, according to an embodiment, the south bridge 826 includes a serial advanced technology attachment ("SATA") adapter for providing one or more serial ATA ports 836 and an ATA 100 adapter for providing one or more ATA 100 ports 844. The serial ATA ports 836 and the ATA 100 ports 844 may be, in turn, connected to one or more mass storage devices storing an operating system 812 and application programs, such as the SATA disk drive 838. As known to those skilled in the art, an operating system 812 comprises a set of programs that control operations of a computer and allocation of resources. An application program is software that runs on top of the operating system software, or other runtime environment, and uses computer resources to perform application specific tasks desired by the user.

The mass storage devices connected to the south bridge 826, and their associated computer-readable media, provide non-volatile storage for the computer 800. Although the description of computer-readable storage media contained herein refers to a mass storage device, such as a hard disk or CD-ROM drive, it should be appreciated by those skilled in the art that computer-readable media can be any available storage media that can be accessed by the computer 800. By way of example, and not limitation, computer-readable storage media includes volatile and non-volatile, removable and non-removable media implemented in any method or technology for storage of information such as computer-readable instructions, data structures, program modules or other data. For instance, computer-readable media includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer 800. It should be appreciated that the add-in card 112 may also be equipped with an appropriate computer-readable storage media for storing the program code described above.

A low pin count ("LPC") interface may also be provided by the south bridge 826 for connecting a "Super I/O" device 890. The Super I/O device 890 is responsible for providing a number of input/output ports, including a keyboard port, a mouse port, a serial interface 892, a parallel port, and other types of input/output ports. The LPC interface may also connect a computer-readable media such as a ROM or a flash memory such as the NVRAM 848 for storing a firmware 850 that includes program code containing the basic routines (e.g. a BIOS) that help to start up the computer 800 and for performing other functions.

It should be appreciated that the software components described herein may, when loaded into the CPU 104 and executed, transform the CPU 104 and the overall computer 800 from a general-purpose computing system into a special-purpose computing system customized to facilitate the functionality presented herein. The CPU 104 may be constructed from any number of transistors or other discrete circuit elements, which may individually or collectively assume any number of states. More specifically, the CPU 104 may operate as a finite-state machine, in response to executable instructions contained within the software modules disclosed herein. These computer-executable instructions may transform the CPU 104 by specifying how the CPU 104 transitions between states, thereby transforming the transistors or other discrete hardware elements constituting the CPU 104.

Encoding the software modules presented herein may also transform the physical structure of the computer-readable media presented herein. The specific transformation of physical structure may depend on various factors, in different implementations of this description. Examples of such factors may include, but are not limited to: the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software may also transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer 800 in order to store and execute the software components presented herein. It also should be appreciated that the computer 800 may comprise other types of computing devices, including hand-held computers, embedded computer systems, personal digital assistants, and other types of computing devices known to those skilled in the art. It is also contemplated that the computer 800 may not include all of the components shown in FIG. 8, may include other components that are not explicitly shown in FIG. 8, or may utilize an architecture completely different than that shown in FIG. 8.

Based on the foregoing, it should be appreciated that concepts and technologies for permanently allocating a large host memory have been presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for allocating memory from a host computer for an add-in card, the method comprising performing, by the host computer, computer-implemented operations for:
   intercepting a first interrupt for resetting a mass storage device;
   in response to intercepting the first interrupt for resetting the mass storage device, reading a system address map, modifying the system address map by adding an entry for an amount of host memory to be allocated to the add-in card, storing the modified system address map as a destination system address map, changing an address of a second interrupt handler for handling interrupts for reporting the system address map, and storing an address of an original interrupt handler for handling interrupts for reporting the system address map in a memory of the add-in card;
   intercepting a second interrupt for reporting the system address map;
   determining whether the second interrupt is memory related;
   in response to determining that the second interrupt is memory related, providing the destination system address map; and
   in response to determining that the second interrupt is not memory related, calling the original interrupt handler at the stored address.

2. The computer-implemented method of claim 1, wherein the first interrupt for resetting a mass storage device comprises an interrupt 13h, AH=00h, in an x86-based computing system.

3. The computer-implemented method of claim 1, wherein the second interrupt comprises an interrupt 15h in an x86-based computing system.

4. The computer-implemented method of claim 1, further comprising in response to intercepting the first interrupt for resetting the mass storage device:
   determining whether a flag indicating that the system address map has been modified has been previously set; and
   in response to determining that the flag has been previously set, resetting the mass storage device without performing the operations of modifying the system address map, storing a modified system address map, and changing an address of an interrupt handler for providing the system address map.

5. The computer-implemented method of claim 1, wherein the destination system address map is stored in the memory of the add-in card.

6. The computer-implemented method of claim 1, wherein the first interrupt for resetting a mass storage device is intercepted by program code stored in an add-in card option read-only memory (ROM).

7. The computer-implemented method of claim 1, wherein the second interrupt is intercepted by program code stored in an add-in card option read-only memory (ROM).

8. The computer-implemented method of claim 1, wherein changing the address of the second interrupt handler for handling interrupts for reporting the system address map comprises modifying an interrupt vector table for the second interrupt handler to point to an address of another interrupt handler.

9. The computer-implemented method of claim 1, wherein the add-in card comprises a mass storage device controller card.

10. A computer-readable storage medium having computer-executable instructions stored thereupon which, when executed by a computer, cause the computer to:
intercept an interrupt for resetting a mass storage device;
in response to intercepting the interrupt for resetting the mass storage device, read a system address map, modify the system address map by adding an entry for an amount of host memory to be allocated to an add-in card, store the modified system address map as a destination system address map, change an address of an interrupt handler for handling interrupts for reporting the system address map, and store an address of an original interrupt handler for handling interrupts for reporting the system address map in a memory of the add-in card;
intercept an interrupt for reporting the system address map; and
provide the destination system address map in response to intercepting the interrupt for reporting the system address map.

11. The computer-readable storage medium of claim 10, wherein the interrupt for resetting a mass storage device comprises an interrupt 13h, AH=00h, in an x86-based computing system and wherein the interrupt for reporting the system address map comprises an interrupt 15h, AX=E820, in an x86-based computing system.

12. The computer-readable storage medium of claim 11, having further computer-readable instructions stored thereupon which, when executed by the computer, cause the computer to:
determine whether a flag indicating that the system address map has been modified has been previously set; and
in response to determining that the flag has been previously set, reset the mass storage device without performing the operations to modify the system address map, store a modified system address map, and change an address of an interrupt handler for providing the system address map.

13. The computer-readable storage medium of claim 12, wherein the destination system address map is stored in the memory of the add-in card.

14. The computer-readable storage medium of claim 10, having further computer-readable instructions stored thereupon which, when executed by the computer, cause the computer to:
determine whether the interrupt for reporting the system address map is memory related; and
in response to determining that the interrupt for reporting the system address map is not memory related, to call the original interrupt handler for handling interrupts for reporting the system address map at the stored address.

15. The computer-readable storage medium of claim 10, wherein the interrupt for resetting a mass storage device is intercepted by program code stored in an add-in card option read-only memory (ROM).

16. The computer-implemented method of claim 10, wherein the interrupt for reporting the system address map is intercepted by program code stored in an add-in card option read-only memory (ROM).

17. A computer system add-in card comprising:
an option read-only memory (ROM) storing computer-readable instructions executable by a host computer comprising
a first interrupt handler for handling an interrupt for resetting a mass storage device, and configured, when called, to read a system address map, to modify the system address map by adding an entry for an amount of host memory to be allocated to the add-in card, to store the modified system address map as a destination system address map, to change an address of an interrupt handler for handling interrupts for reporting the system address map, and to store an address of an original interrupt handler for handling interrupts for reporting the system address map in a memory of the add-in card, and
a second interrupt handler for handling an interrupt for reporting the system address map, and configured to provide the destination system address map when called.

18. The computer-system add-in card of claim 17, wherein the interrupt for resetting a mass storage device comprises an interrupt 13h, AH=00h, in an x86-based computing system and wherein the interrupt for reporting the system address map comprises an interrupt 15h, AX=E820, in an x86-based computing system.

19. The computer-system add-in card of claim 17, wherein the first interrupt handler is further configured when called to determine whether a flag indicating that the system address map has been modified has been previously set, and in response to determining that the flag has been previously set, to reset a mass storage device without performing the operations to modify the system address map, store a modified system address map, and change an address of an interrupt handler for providing the system address map.

* * * * *